US005146946A

United States Patent [19]

Maugans

[11] Patent Number: 5,146,946

[45] Date of Patent: Sep. 15, 1992

[54] APPARATUS FOR IMPROVING THE VISCOSITY OF COATING MATERIALS

[75] Inventor: James R. Maugans, San Francisco, Calif.

[73] Assignee: Binks Manufacturing Company, Franklin Park, Ill.

[21] Appl. No.: 708,940

[22] Filed: May 31, 1991

[51] Int. Cl.[5] .............................................. F16K 49/00

[52] U.S. Cl. ...................................... 137/340; 137/13

[58] Field of Search .................................. 137/340, 13

[56] References Cited

U.S. PATENT DOCUMENTS 868,397 10/1907 Bergmans ............................ 137/340

1,743,245 1/1930 Smith .................................. 137/340

2,060,936 11/1936 Haag, Jr. ............................ 137/340

*Primary Examiner*—A. Michael Chambers

*Attorney, Agent, or Firm*—David O'Reilly

[57] ABSTRACT

A system for improving the viscosity of coating materials comprised of coaxial hoses inserted in a coating material supply hose. A heating fluid is continuously circulated through the coaxial hoses to heat a thin film of coating material in the supply hose. The heating fluid, preferably deionized water, heats the coating material to a preselected temperature to provide optimum viscosity for highest coating efficiency. An emulsifier added to the heating fluid improves heat retention and flow rates by improving lubricity. The coaxial hose heating system is connected to the coating material through a coupling and distributor block that allows easy removal for repair, replacement or use without the hose heater.

14 Claims, 1 Drawing Sheet

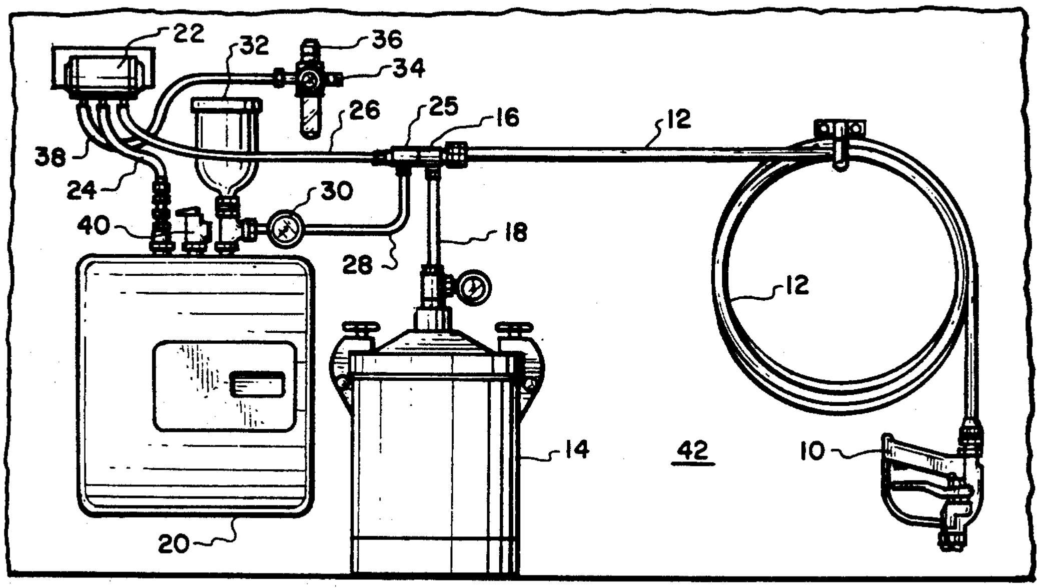
Fig. 1.
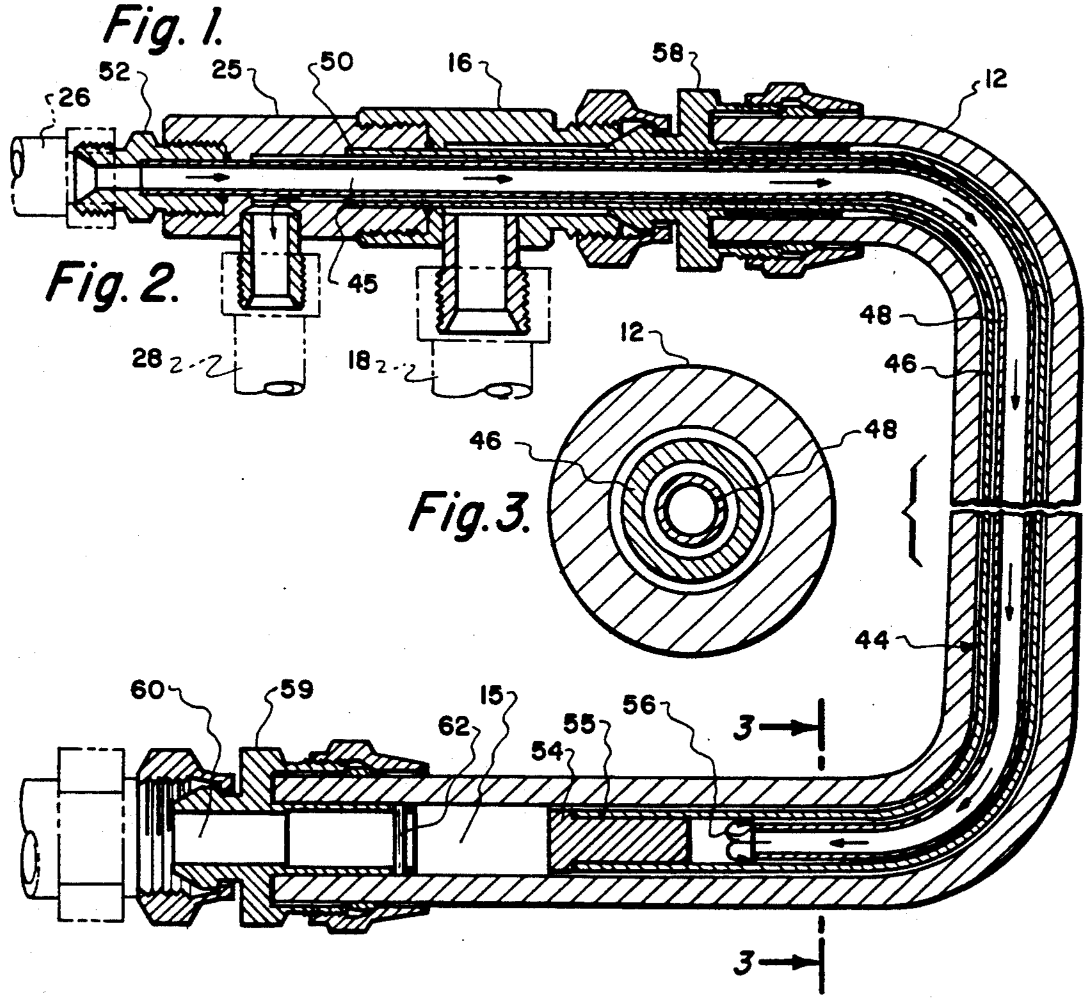
Fig. 2.
Fig. 3.

APPARATUS FOR IMPROVING THE VISCOSITY OF COATING MATERIALS

FIELD OF THE INVENTION

This invention relates to a method and apparatus for heating fluids to improve or reduce viscosity and more particularly relates to a heating system for improving the viscosity of coating materials.

BACKGROUND OF THE INVENTION

Improving or reducing viscosity of a coating material can improve the sprayability and the coating efficiency. Thinning with a solvent will improve viscosity but coating efficiency will be reduced and may require several coatings. The best method to improve viscosity while maintaining coating efficiency is by heating the coating material and is particularly effective in cold environments where low temperatures will increase viscosity. Further clean air regulations limit the amount and type of solvents that can be used with coatings. Therefore reducing viscosity with heat helps in complying with the clean air regulations.

One method of heating a coating material is to heat the supply reservoir. A disadvantage of this method is that when pumped long distances the coating material will cool. This could be overcome by heating the material an amount sufficient to compensate for cooling in a supply hose. A standard method for heating coating materials is to recirculate the fluid from a pump to a heater, then to a spray gun and back to the pump. This method is more costly initially, can require a bit of maintenance and is awkward to use by the sprayman.

Another known method is to heat the material from the supply as close to the spray tip as possible. One such method is disclosed is U.S. Pat. No. 4,036,020 issued Jul. 19, 1977. In this patent a fluid is heated as it flows through a nozzle passage by a heater comprised of concentric converging cones containing a hot fluid. The purpose of this patent is to expand and improve vaporization of a working fluid to produce a high velocity stream in a turbine.

In another invention disclosed in U.S. Pat. No. 3,632,042 windshield washer fluid is kept warm in a tube by hot coolant from the engine flowing in a coaxial tube. The engine coolant is used to heat the washer fluid throughout the path to the spray nozzles. The purpose of this invention is to prevent windshield washer fluid water from freezing in cold temperatures. This system simply prevents the washer fluid from icing and clogging the nozzle.

Another system for reducing the viscosity of a patent is described in British Pat. No. 700,595. In this invention a paint material is supplied to a spraying device after passing through a coil immersed in a hot water bath. A disadvantage of this system is that it is difficult to maintain an optimum temperature.

Other systems for preheating a fluid are disclosed is U.S. Pat. Nos. 930,346; 1,844,653 and 4,728,036. In these patents a fluid is preheated to improve atomization at a nozzle. The intent of these patents is to substantially increase vaporization to improve burning efficiency. These devices would not be advantageous for use with coating materials which flow best and coat efficiently at moderate regulated temperatures.

It is one object of the present invention to provide a system for reducing the viscosity of coating materials to keep the use of solvents in compliance with clean air regulations.

An additional object of the present invention is to provide a system for efficiently reducing viscosity of coating materials by controlled heating to improve spray quality.

Yet another object of the present invention is to provide a system for reducing or controlling viscosity that controls the maximum material temperatures while heating the heat sensitive materials. Temperature control prevents multiple component materials from reacting too quickly.

Yet another object of the present invention is to provide a system for improving viscosity that creates a "thin film" between a coaxial heating hose and an outer hose that increases the coating material surface in contact with the hose to improve temperature control and speed heating.

Yet another object of the present invention is to provide a system to improve viscosity by heating which includes an emulsion in the heating fluid that has a higher specific heat. The emulsifier increases the transfer of heat to the coaxial hose to the material being heated.

Still another object of the present invention is to provide a system for improving viscosity a coating material that includes a lubricant in the heating material to reduce line friction increasing flow substantially.

Still another object of the present invention is to provide a system for improving the viscosity of coating materials by heating that uses a dielectric medium circulated in the coaxial hose when used with electrostatic spray units and spraying electrically conductive coating to prevent shorting of the high voltage system.

BRIEF DESCRIPTION OF THE INVENTION

The purpose of the present invention is to provide a method and apparatus for controlled heating of coating materials to improve viscosity and flow of the coating material to a spray gun.

The apparatus of the invention achieves the above purposes by providing a coaxial hose heating unit that can be inserted inside a paint supply hose. A heating fluid, such as hot water is pumped through an inner hose of the coaxial hose heating system and returns through an outer hose to a heater. The pump then pumps the water from the heater controlling the flow of heating fluid to the coaxial heating hose system.

The optimum viscosity of a coating material is maintained by controlling the material from the source or supply to very near the point of spraying such as at a spray gun. To accomplish this the coating material is heated by a coaxial hose heating system constructed for insertion into the coating material supply hose. The coaxial heating hose has an outer return hose terminated by a plug and an inner coaxial supply hose. The coaxial heating hose is connected to a heater to maintain the temperature of the heating fluid, preferable deionized water being circulated by an air pump. Optionally the fluid can be a deionized, demineralized or dielectric medium, or a blend of materials to improve heating fluid flow and specific heat. The heater receives the cooled heating fluid from the outer return hose, reheats it to a selected maximum temperature then delivers it to a pump for delivery to the inner heating fluid supply hose. The flow and temperature can vary over a wide range to maintain the optimum temperature of the coating material for best coating efficiency. Temperatures of the coating material in the range of 80° F. to 120° F. can be maintained by a heating fluid at a temperature in the range of 135° F. to 145° F.

The heating system controls the maximum coating material temperature which is important when heating a heat sensitive material. Certain multiple component materials may react too quickly if the temperature exceeds a certain point. Also some waterborne adhesives and coatings may react adversely when improperly heated. For that reason the pump in the heating system maintains the temperature of the coating material near its optimum value.

The coaxial hose heating system has an outer ID size to create a "thin film" of coating material between it and the coating material supply hose. This increases the coating material surface in contact with the heating hose which speeds and improves controlled heating of the coating material.

To further improve the overall effectiveness of the hose heating system an additive blend or emulsifier is added to the recirculating water. Preferable the water is deionized water and the additive is based on known glycol technology and adds some unique properties to the recirculating heating fluid. The lubricity of the deionized water is increased reducing fluid friction to produce a net result of improve flow of the heating fluid. The heating fluid, now having a slightly higher viscosity than water alone will also retain heat for a longer period of time. This results in a more even heat exchange over the length of the delivery hose by substantially reducing temperature drop over the length of the hose as well as a slight reduction of heat (BTUs) needed to maintain desired temperature. A substantial increase in the overall efficiency of the heating system is achieved with the addition of the emulsifier. Circulation of the heating fluid is improved and contaminant buildup is reduced.

The emulsifier is an additive blend such as a micronized polyethylene wax emulsion which is added to the recirculating deionized water. This material is a suitable emulsifier that will act as a lubricant and heat transfer liquid that is virtually non-toxic. The emulsifier is similar to materials normally used in latex paints and floor polishes such as a material known by the trademark Johnwax 46. The emulsifier is added in a ratio of about two pints per five gallons of water or in a ratio of about twenty to one (20/1).

For electrostatic spray equipment for waterborne material applications which are electrically conductive a dielectric fluid can be used as the heating fluid. Waterborne coatings are electrically conductive and without a special dielectric material in the heating hose system an electrostatic unit could not be operated. A suitable dielectric heating fluid would be an oil or glycol based material.

The length of the coaxial heating system is substantially the same as the length of the coating material supply hose. A hose fitting on the end of the supply hose includes a pin or a cross bar to keep the coaxial hose from expanding into the spray gun as a result of heat or pressure during use. A pin or cross bar at the end of the coating material supply hose fitting blocks the coaxial heating hose from stretching into the gun inlet once at operating temperature. If the gun inlet is restricted or blocked at all by the coaxial heating hose, coating material cannot flow properly. The stretching is caused by expansion of the hose when heated plus pressure and friction of the coating material flowing through the material hose.

The above and other features of this invention will be fully understood from the following detailed description and the accompanying drawings, in which:

BRIEF DESCRIPTION OF THE DRAWINGS

FIG. 1 is a diagram of a thermally controlled coating material spray system.

FIG. 2 is a detailed sectional view of the coating material supply hose and the coaxial hose heating system.

FIG. 3 is a sectional view taken at 3—3 of FIG. 2.

DETAILED DESCRIPTION OF THE INVENTION

A system for controlling the viscosity of a coating material is illustrated generally in FIG. 1. Generally, coating material supply systems are comprised of a spray gun 10 connected by a supply hose 12 to a supply tank or reservoir 14 through a coupling 16 and a connecting hose 18. Reservoir 14 is a pressurized container that delivers material through supply hose 12 to the spray gun 10. A pump may be used but a pressurized container is preferred for polymers because a pump can have shear on particles and damage the material affecting film integrity. For best coating efficiency it is important to maintain the viscosity of coating materials at an optimum.

To maintain or improve the viscosity of a coating material a heating system is provided comprised of heater 20, air pump 22 for supplying a heating fluid, preferably deionized water to distributor block 25 for distribution to a hose heating system which will be described in greater detail hereinafter. Air pump 22 pumps heated fluid received from heater 20 at about 80 psi through hose 24 to hose 26 for delivery through distributor block 24. Cooled heating fluid is returned through hose 28 and thermometer 30 to heater 24 for reheating. Cup 32 is for expansion and overflow of heating fluid returning through hose 28. Pump 22 is driven by air supplied through coupling 34 air regulator 36 and hose 38. Safety against overheating and excessive pressure is provided by safety relief valve 40 mounted on heater 20. Heater 20 is a compact efficient heater such as a compact instantaneous Ariston water heater model P-155 distributed by Controlled Energy Corp., Fiddler's Green, Vermont.

The system shown in FIG. 1 is very efficient and compact and can be mounted on a wall 42 as shown or on a mobile cart if desired. The heating system can be mounted on the frame of the cart with the coating material reservoir 14 mounted on a platform on the cart.

The coaxial hose heating system is shown in greater detail in FIG. 2 and 3. The hose heating system 44 is a coaxial hose system having a flexible nylon or polyethylene outer hose 46 and a smaller diameter flexible nylon or polyethylene inner hose 48. The concentric hoses 46 and 48 are attached to distributor block at 50 and 52. The end of outer hose 46 is closed by a plug 54. Heating fluid flows through inner hose 48, to end 56 for recirculation back to the heater through outer hose 46 and return hose 28. Coating material 15 is thus continuously heated from by hose heater 44 from supply 14 to spray gun 10.

Hose heater 44 is easily removed from coating material supply hose 12 by disconnecting the supply hose coupling 58 and withdrawing the heating hose assembly 44. Alternatively, inlet and outlet hose 26, 28 can be removed and distributing block 24 disconnected from coupling 16 allowing the hose heating system 44 to be easily withdrawn. The other end of coating material supply hose 12 has a fitting 59 for attaching the supply hose to a spray gun 10.

The heating fluid supplied to heating hose system 44 is preferably deionized water that is recirculated continually through the heating system. The overall effectiveness of the hose heating system can be enhanced by an additive blend or emulsifier mixed with the recirculating deionized water. The emulsifier is a blend based on known glycol technology and adds unique properties to the recirculating heating fluid. The lubricity of the deionized or distilled water is increased to reduce fluid friction with a net result of an improved flow. That is an emulsifier is chosen that makes the heating fluid (i.e. water slippery), which will now have a slightly higher viscosity than water with the additive emulsifier has a specific heat and retains heat for a longer period of time. This results in even more heat exchange over the length of the delivery hose, as well as a slight reduction of heat (BTU's) needed to maintain desired temperature. Repeated testing proved that the total efficiency of the hose heating system increased as much as 25% with the addition of the emulsifier.

The emulsifier is a blend of materials such as a micronized polyethylene wax emulsion which will stay in suspension in water. The proportions of materials in the emulsifier can be five gallons of distilled water for every two pints of emulsifier or a ration of about twenty to one (20/1). The emulsifier is similar to those used in latex paints and floor polishes and is preferred for its lubricating, heat transfer qualities and is virtually nontoxic. One such material is known by the name Johnwax 46.

Another option would be to add a dielectric fluid in place of the deionized water. The system can then be used with electrostatic spray equipment for waterborne material applications. These waterborne coatings are electrically conductive and without a special dialectic materials the system could not be used with an electrostatic unit. A suitable dielectric fluid can be selected from the group consisting of propylene or ethylene glycol groups of materials. The emulsifier described above can be a blend of lubricating synthetic or wax materials.

To prevent the end 54 of heating hose system 44 from stretching into gun inlet 60 a barrier 62 is provided by a single pin or a cross bar. The pin 62 is fitted into material outlet fitting 59 on coating material supply hose 12. Pin 62 provides a barrier or stop to block heating hose system 44 from entering the gun inlet 60 if restricted or blocked by end 54 of hose heating system 44 coating material could not flow properly. Stretching of the heating hose system can be caused by expansion of the hose when heated plus pressure and friction of the coating material flowing through material hose 12.

In use hot water with or without emulsifier is pumped into inner hose 48 and recirculated back to the heater 20 through outer hose 46. The heating fluid or deionized water is continuous circulated through heating hose system 44 inserted into paint supply hose 12. Coating material is then supplied through hose 18 to coupling 16. The inside diameter of paint supply hose 12 and outside diameter of outer hose 46 are selected to create a "thin film" of coating material between it and supply hose 12. This increases the coating material's surface contact with heating hose system 44 which improves temperature control and speeds heating of the coating material. The temperature of heater 20 is adjusted by a thermostat to maintain the temperature of the coating material in the range of 80° F. to 120° F. which is the optimum temperature for improving the viscosity and maximum efficiency of most coating materials this system is to be used with. The optimum temperature will vary according to the coating material used. In standard fluid heating systems the fluid can be subjected to temperatures of 160 to 200 degrees Fahrenheit particularly when not kept moving. Heater 20 of the present invention has a thermostatically preset temperature that is the maximum that can be attained in the coating material, even with the flow stopped.

The thin film is created by keeping the outside diameter of outer hose 46 within a preselected range of the inside diameter of coating material supply hose 12. The difference between the outside diameter of inner hose 46 and the inside diameter of coating material supply hose 12 should not be greater than about 0.25" for a hose in the ⅜ inch range. This will provide a spacing of about 1/16 of an inch which is a sufficiently thin film of coating material to heat a coating material quickly and evenly without restricting flow. On larger bases a spacing up to about ¼ inch is practical with a range of 1/16 inch to ⅛ inch being preferred.

The hose heating system 44 is constructed, as described previously, to be easily removed for repair or replacement or if heating of the coating material is not needed. The distributor block 24 in coupling 16 can be separated and heating hose assembly 44 simply withdrawn. A plug then can be put in the end of coupling 16 and the spray system can be used without heating. Flexible coax hose heating system 44 is an assembly that can be easily re-inserted inside coating material supply hose 12. It can be easily removed, cleaned, replaced or operated outside the hose as an independent unit. For example, it can be used for immersion heating in an open container, it can be wrapped outside container 14 and can be in a variety of lengths to fit specific needs. It is an assembly that is constructed completely independent of supply hose 12 so that it has a wide range of applications. With the system disclosed distributor block 24 can be replaced with a manifold allowing multiple heating hose sets to be operated off one heating system making the system a versatile source for heating in a variety of applications.

Thus there has been disclosed a novel system for heating coating materials to improve viscosity and coating efficiency. The system is simple and easy to install and can be easily removed for cleaning or replacement. Multiple units are easy to add to the system.

This invention is not to be limited by the embodiment shown in the drawings and described in the description which is given by way of example and not of limitation, but only in accordance with the scope of the appended claims.

What is claimed is:

1. A system for controlling the viscosity of a coating material delivered to a spray gun comprising;

a reservoir for storing a coating material;

a supply hose for supplying said coating material to a spray gun;

connecting means connecting said supply hose to said reservoir at one end and to said spray gun at the other;

heating means for heating said coating means throughout its flow through said supply hose, said heating means comprising;

a low friction fluid;

heating means for heating said low friction fluid;

coaxial hose means constructed to be inserted inside said supply hose for circulating said heated low friction fluid, said coaxial hose means having a length that extends approximately to the end of said supply hose connected to said spray gun; approximately equal to the length of said supply hose;

pump means for continually circulating said low friction heating fluid through said heating means and said coaxial hose;

distribution means connecting said coaxial hose to said pump means, said heating means and to the supply end of said supply hose;

whereby said heating means maintains the delivered temperature of said coating material at said spray gun at a predetermined level.

2. The system according to claim 1 in which said low friction heating fluid is deionized water.

3. The system according to claim 2 in which said low friction heating fluid includes an emulsifier to increase lubricity and circulation of said heating fluid.

4. The system according to claim 3 in which the ratio of emulsifier to deionized water is approximately one part emulsifier to twenty parts water.

5. The system according to claim 4 in which said emulsifier is a blend of synthetic lubricating compounds.

6. The system according to claim 5 in which said emulsifier is a micronized polyethylene wax emulsion.

7. The system according to claim 1 in which the difference between the outer diameter of said coaxial hose means and the inner diameter of said supply hose is no more than about one quarter of an inch whereby a thin film between said heating hose system and said supply hose is created.

8. The system according to claim 1 in which said heater means maintains said heating fluid at a temperature in the range of 135° F. to 145° F.

9. The system according to claim 1 including connecting means connecting said heating means to said coating material supply hose; said connecting means constructed to allow removal of said heater means system; whereby said hose heater can be easily removed for repair, replacement or use of said coating material supply hose without said hose heating system.

10. The system according to claim 1 in which said connecting means includes a coupling on the inlet end of said supply hose connecting said distribution means to said coating material supply hose.

11. The system according to claim 1 in which said distribution means comprises a distribution block; said distribution block having an inlet and outlet for said coaxial hose and coupling means connecting said distribtuion block to said coating material supply hose.

12. The system according to claim 11 in which said connecting means includes a coupling having a threaded inlet for connecting said distribution block; a nipple for connecting a supply hose to coating material supply means and a threaded outlet for connecting said coating material supply hose.

13. The system according to claim 1 in which said low friction fluid is a dielectric fluid.

14. The system according to claim 13 in which said dielectric fluid is selected from the group consisting of an oil or glycol based material.

* * * * *